Jan. 5, 1960    N. B. MURPHY    2,919,883
LIQUID DAMPED VIBRATION ISOLATOR
Filed Dec. 11, 1958

INVENTOR.
NORMAN B. MURPHY
BY Herbert L. Davis
ATTORNEY

United States Patent Office 2,919,883
Patented Jan. 5, 1960

2,919,883

LIQUID DAMPED VIBRATION ISOLATOR

Norman B. Murphy, Tenafly, N.J., assignor to Bendix Aviation Corporation, Teterboro, N.J., a corporation of Delaware Application December 11, 1958, Serial No. 779,758

8 Claims. (Cl. 248—358)

This invention relates to a liquid damped vibration isolator and more particularly to a vibration isolator including means to provide fluid damping of movements in horizontal and vertical planes.

Prior apparatus designed for light loads have various shortcomings including high hysteresis due to friction damping causing the vertical height of the apparatus to vary after the isolator has been depressed under normal load conditions and a change in the damping value with wear as well as variations in the damping ratio between isolators of the same type.

An object of the invention is to provide a liquid or oil damper vibration isolator having a high damping ratio with extremely low hysteresis so arranged as to eliminate high internal friction through liquid damping resulting in a better isolation above the natural frequency of vibration and an apparatus which will consistently return to the same vertical height after being depressed under normal load conditions.

Another object of the invention is to provide an improved liquid damped vibration isolator.

Another object of the invention is to provide a novel vibration isolator unit including a mounting base carrying a piston and a ring-like cylinder, the cylinder being free to move in a horizontal plane in a chamber filled with oil or other damping fluid while the piston is movable in a vertical plane within the cylinder so as to force the damping fluid through a restricted orifice in a plate between an upper bellows forming the enclosure for the damping fluid at one side of the orifice and a lower bellows at the opposite side of the orifice arranged to receive the damping fluid displaced by the piston when moved in a vertical plane by a load applied at the free end of the upper bellows.

Another object of the invention is to provide a vibration isolator unit of the aforenoted type in which one or the other or both bellows may serve as a spring means to determine the capacity of the unit or a separate spring may bias the upper bellows so as to provide such effect, or a pressure chamber may surround the lower bellows and air or other gaseous medium under pressure in such chamber may bias the lower bellows so as to provide a spring means having the correct spring rate to match the weight of the object to be isolated or the bellows, spring and pressure chamber may be so combined as to effect the foregoing.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

Figure 1:
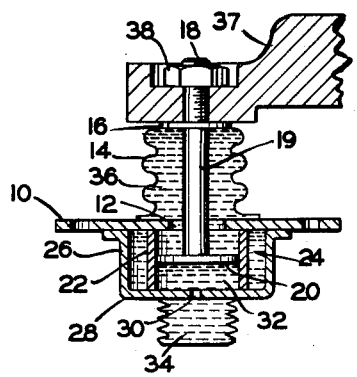
Figure 1 is a cross sectional view of one form of a vibration isolator device embodying the invention.

Referring to the drawing of Figure 1, there is indicated by a numeral 10 a fixed mounting plate having an opening 12 therein and a resilient bellows 14 at the upper side of the plate 10 surrounding the opening 12. At a free end of the bellows 14 there is affixed a plate 16 from which projects at the upper side of the plate 16 a screw threaded mounting post or bolt 18.

From the opposite side of the plate 16 there projects a piston rod 19 which extends through the bellows 14 and opening 12 in the mounting plate 10 to a damping plunger or piston 20 slidably mounted in an annular cylinder or ring 22. The ring-like annular cylinder 22 is in turn movable in a horizontal plane in an annular chamber 24 having an annular wall surface 26 positioned in spaced relation to the ring-like annular cylinder 22 and an end wall 28 positioned in a horizontal spaced relation to the mounting plate 10. The cylinder 22 is arranged to move horizontally on the inner surfaces of the end wall 28 and mounting plate 10, as shown in Figure 1.

Concentrically positioned in the end plate 28 is a calibrated restriction or orifice 30 opening a chamber 32 within the cylinder 22 and at the under side of the piston 20 to a lower resilient bellows 34 mounted on the end plate 28 at the opposite side of the orifice 30 so as to receive therein oil or other damping fluid displaced from the chamber 32 by movement of the piston 20 in a vertical plane. The bellows 14 and 34 may be of thin walled cylindrical metal bellows type including a number of elements arranged so as to respond to pressures applied thereto.

The chamber 36 within the upper bellows 14 at the upper side of the piston 20 as well as the chamber 32 at the lower side of the piston 20 and interior of the lower bellows 34 are filled with oil or other damping fluid so that as the piston 20 moves in a vertical plane the oil or damping fluid therein under pressure will be forced through the orifice 30. The chamber 24 between the annular cylinder 22 and annular wall 26, is also filled with an oil or damping fluid so as to provide damping upon movement of the cylinder 22 in a horizontal plane. Thus upon sideward movement of the plate 16 there is imparted through the piston rod 19 to the piston 20 and in turn to the cylinder 22 a force tending to cause the cylinder 22 to move horizontally within the damping fluid chamber 24 so as to displace the damping fluid from one side to the other of the cylinder 22 in a damping action.

As shown in Figure 1, the plate 10 may be mounted in a fixed relation while a load on the object to be isolated and indicated by the numeral 37 may be fixed to the mounting post or bolt 18 by a suitable securing nut 38. Moreover, the resilient bellows 14 is provided with an inherent spring rate such as to govern the capacity of the vibration isolator unit. Similarly the resilient bellows 34 or both bellows may effect such result.

In another form of the invention illustrated in Figure 2, corresponding numerals indicate corresponding parts to those described with reference to the form of invention illustrated in Figure 1 and in addition to the parts described with reference to the form of the invention of Figure 1, there is provided in the device of Figure 2 the additional structure of a spring 40 acting between the mounting plate 10 and the bellows plate 16 to augment the inherent spring force of the resilient bellows 14. There is further provided an auxiliary pressure chamber 42 surrounding the lower damping bellows 34 having a chamber 44 filled with air or other gaseous medium under pressure acting on the exterior surface of the bellows 34 so as to control the spring rate of the bellows 34 and capacity of the vibration isolator unit of the form of Figure 2.

Figure 2:
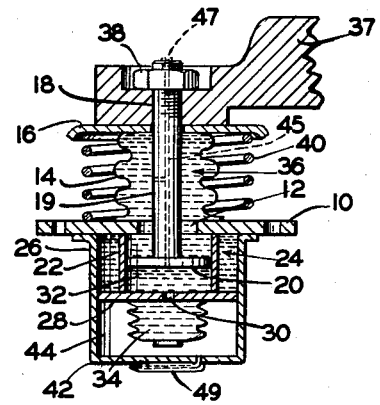
Figure 2 is a cross sectional view of a second form of vibration isolator device embodying the invention.

As illustrated in the form of invention of Figure 2, there is further provided a longitudinal passage 45 extending through the bolt 18 and piston rod 19 for filling the chambers 32 and 36 with damping fluid. The passage 45 is closed by a small plug or screw 47. There is further provided a suitable filling tube 49 for supplying air or other gaseous medium under pressure to the chamber 44 to control the spring rate of the bellows 34 and capacity of the vibration isolator unit.

In the further modified form of the invention illustrated in Figure 3, corresponding numerals indicate corresponding parts to those heretofore described with reference to the forms of the invention illustrated in Figures 1 and 2. In the form of invention shown in Figure 3, a plate 50 secured at the lower end of the chamber 42 provides the means for fixedly mounting the vibration isolator assembly instead of the plate 10 heretofore described with reference to the forms of the invention of Figures 1 and 2. In the form of invention illustrated in Figure 3 the coil spring 40 of Figure 2 is not utilized and air or other gaseous medium in the chamber 44 may be utilized to provide the bellows 34 with a correct spring rate to match the weight of the load or object to be isolated as applied through the arm 37.

Figure 3:
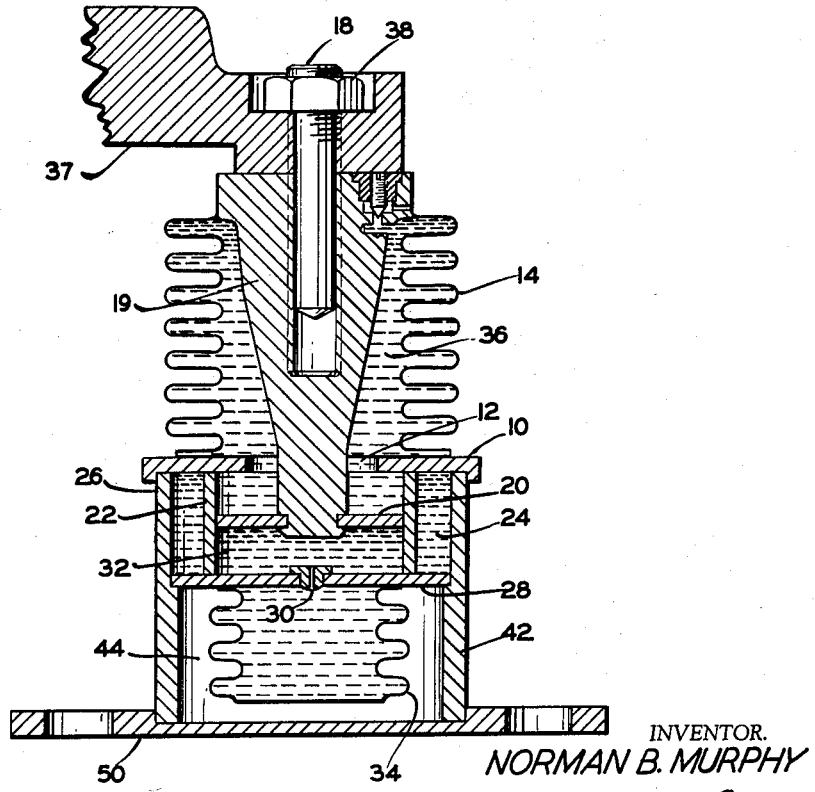
Figure 3 is a cross sectional view of a third form of vibration isolator device embodying the invention.

In the form of invention illustrated in Figures 1, 2 and 3, it will be seen that there is provided a piston 20 and cylinder 22 and that the cylinder 22 is free to move in a horizontal plane in a chamber 24 filled with oil or other damping fluid. The piston 20 is in turn also free to move in a vertical plane so as to cause oil or other damping fluid to be displaced through the restricted orifice 30 to and from a chamber 32 relative to a chamber provided by a lower bellows 34 with a damping action.

As shown in the drawings of Figures 1, 2 and 3, the upper bellows 14 forms the enclosure for the damping fluid or oil and may also act as a spring which determines the capacity of the unit. The lower bellows 34 provides a second enclosure to receive the fluid displaced by the damping plunger 20 when moved in a vertical plane. The inherent spring rate of the bellows 34 may be such as to determine the capacity of the unit or the bellows 34 may cooperate with the bellows 14, spring 40 or fluid pressure chamber 42 to effect such result.

Since the invention illustrated in Figures 1, 2 and 3 relies upon fluid damping there is little or no internal friction in the mount and the position of the load as applied through the arm 37 relative to the mounting plate 10 or 50, as the case may be, will always be maintained. The unit also provides damping upon movement of the load in a horizontal tilting plane and such movement causes the cylinder 22 to move within the chamber 14 thereby displacing oil or other damping fluid from one side of the chamber 24 to the other with a damping action.

In the form of the invention of Figures 1, 2 and 3, the inherent spring rate of the bellows 14 may be utilized as the main isolator means, as in Figure 1, or there may be a separate spring 40 providing the spring rate for the main isolator means or there may be provided an auxiliary pressure chamber such as 42 with air or other gaseous medium under pressure acting on the bellows 34 so as to provide a correct spring rate to match the weight of the component to be isolated, as illustrated in Figures 2 and 3. Such features may be combined to provide the desired action, as in Figure 2.

Although only three embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. A vibration isolator device comprising a pair of expansible chambers, a third chamber positioned between the pair of expansible chambers, a damping liquid medium in said chambers, a plate between the third chamber and one of the expansible chambers, said plate having a restricted orifice therein connecting the third chamber and said one expansible chamber, means to receive a weighted object at a free end of the other of said expansible chambers, a ring-like cylinder movable in one plane in said third chamber against the liquid medium therein with a damping effect, a piston slidably mounted in said cylinder and movable in another plane, a rod operatively connecting the free end of said other expansible chamber to said piston and projecting through said expansible chamber into said third chamber and ring-like cylinder so as to transmit movement of the free end of said other expansible chamber in said other plane to said piston to force the liquid medium through the restricted orifice from one side of said plate to the other side with a damping effect, and resilient means to oppose the weight of the object to be received at the free end of said other expansible chamber.

2. A vibration isolator means comprising a hydrostatic pressure responsive device including a first bellows and a second bellows providing a pair of expansible chambers, means for receiving an object having weight at a free end of the first of said bellows, a third chamber positioned between the pair of expansible chambers, a damping liquid in said chambers, a plate between the third chamber and the expansible chamber of said second bellows, said plate having a restricted orifice therein connecting the third chamber and the expansible chamber of said second bellows, a ring-like cylinder movable in one plane in said third chamber against the liquid medium therein with a damping effect, a piston slidably mounted in said cylinder and movable in said cylinder in another plane, a rod operatively connecting the free end of said first bellows to said piston, said rod projecting through the interior of said first bellows into said third chamber and ring-like cylinder so as to impart movement of the free end of said first bellows in said other plane to said piston to force liquid medium through the restricted orifice from one side of said plate to the other side with a damping effect and at least one of said bellows having an inherent spring force to oppose the weight of the object at said receiving means.

3. A vibration isolator means comprising a hydrostatic pressure responsive device including a first bellows and a second bellows providing a pair of expansible chambers, means for receiving an object having weight at a free end of the first of said bellows, a third chamber positioned between the pair of expansible chambers, a damping liquid in said chambers, a plate between the third chamber and the expansible chamber of said second bellows, said plate having a restricted orifice therein connecting the third chamber and the expansible chamber of said second bellows, a ring-like cylinder movable in one plane in said third chamber against the liquid medium therein with a damping effect, a piston slidably mounted in said cylinder and movable in said cylinder in another plane, a rod operatively connecting the free end of said first bellows to said piston, said rod projecting through the interior of said first bellows into said third chamber and ring-like cylinder so as to impart movement of the free end of said first bellows in said other plane to said piston to force liquid medium through the restricted orifice from one side of said plate to the other side with a damping effect, and a coil spring acting on one of said bellows so as to oppose the weight of the object at said receiving means.

4. A vibration isolator means comprising a hydrostatic pressure responsive device including a first bellows and a second bellows providing a pair of expansible chambers, means for receiving an object having weight at a free end of the first of said bellows, a third chamber positioned between the pair of expansible chambers, a damping liquid in said chambers, a plate between the third chamber and the expansible chamber of said second bellows, said plate having a restricted orifice therein connecting the third chamber and the expansible chamber of said second bellows, a ring-like cylinder movable in one plane in said third chamber against the liquid medium therein with a damping effect, a piston slidably mounted in said cylinder and movable in said cylinder in another plane, a rod operatively connecting the free end of said first bellows to said piston, said rod projecting through the interior of said first bellows into said third chamber and ring-like cylinder so as to impart movement of the free end of said first bellows in said other plane to said piston to force liquid medium through the restricted orifice from one side of said plate to the other side with a damping effect, a pressure chamber about the second of said bellows, and said pressure chamber including a gaseous medium under pressure acting on said second bellows so as to oppose the weight of the object at said receiving means.

5. A vibration isolator means comprising a hydrostatic pressure responsive device including a first bellows and a second bellows providing a pair of expansible chambers, means for receiving an object having weight at a free end of the first of said bellows, a third chamber positioned between the pair of expansible chambers, a damping liquid in said chambers, a plate between the third chamber and the expansible chamber of said second bellows, said plate having a restricted orifice therein connecting the third chamber and the expansible chamber of said second bellows, a ring-like cylinder movable in one plane in said third chamber against the liquid medium therein with a damping effect, a piston slidably mounted in said cylinder and movable in said cylinder in another plane, a rod operatively connecting the free end of said first bellows to said piston, said rod projecting through the interior of said first bellows into said third chamber and ring-like cylinder so as to impart movement of the free end of said first bellows in said other plane to said piston to force liquid medium through the restricted orifice from one side of said plate to the other side with a damping effect, a coil spring biasing said first bellows in a sense to oppose the weight of the object at said receiving means, a pressure chamber about the second of said bellows, said pressure chamber including a gaseous pressure medium biasing said second bellows in a sense to oppose the weight of the object at said receiving means.

6. In a support for an object subject to vibration of a type including a pair of flexible chambers having liquid under pressure therein to dampen vibration of said object supported at a free end of one of said flexible chambers; the improvement comprising a third chamber open to the liquid under pressure from said one flexible chamber, and said third chamber having a restricted orifice therein leading to the other of said flexible chambers, a piston movable in said third chamber to displace liquid to and from the third chamber through said restricted orifice with a damping action, and means operably connecting the free end of said first-mentioned flexible chamber to said piston for imparting such movement thereto.

7. In a support for an object subject to vibration of a type including a pair of flexible chambers having liquid under pressure therein to dampen vibration of said object supported at a free end of one of said flexible chambers; the improvement comprising a third chamber having a liquid therein and open to the liquid under pressure from said one flexible chamber, said third chamber having a restricted orifice therein leading to the other of said flexible chambers, a member movable in one plane in said third chamber, and means operably connecting the free end of the first-mentioned flexible chamber to said member so that a movement of the object in a plane corresponding to said one plane may effect said movement of the member in the third chamber and cause a displacement of the liquid in the third chamber from one side thereof to the other with a damping action.

8. In a support for an object subject to vibration of a type including a pair of flexible chambers having liquid under pressure therein to dampen vibration of said object supported at a free end of one of said flexible chambers; the improvement comprising a third chamber having a liquid therein and open to the liquid under pressure from said one flexible chamber, and said third chamber having a restricted orifice therein leading to the other of said flexible chambers, a cylindrical member movable in said third chamber to displace liquid in the third chamber from one side thereof to the other with a first damping action, a piston movable in said cylindrical member to displace liquid to and from the third chamber through the restricted orifice with a second damping action, and means operably connecting the free end of said first-mentioned flexible chamber to said piston so that upon a movement of the free end in one plane there is effected a corresponding movement of the cylindrical member with said first damping action while upon a movement of the free end in another plane there is effected a movement of the piston in said cylindrical member with said second damping action.

References Cited in the file of this patent
UNITED STATES PATENTS

| | | |
|---|---|---|
| 1,878,756 | Caldwell | Sept. 20, 1932 |
| 2,417,096 | Thiry | Mar. 11, 1947 |
| 2,773,686 | Nash | Dec. 11, 1956 |